United States Patent
Takei et al.

(10) Patent No.: US 6,677,694 B1
(45) Date of Patent: Jan. 13, 2004

(54) DC MOTOR WITH BRUSHES

(75) Inventors: Hiromitsu Takei, Suwa-gun (JP); Masayuki Katagiri, Suwa-gun (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 133 days.

(21) Appl. No.: 09/665,777

(22) Filed: Sep. 18, 2000

(30) Foreign Application Priority Data

Sep. 20, 1999 (JP) .......................................... 11-264827

(51) Int. Cl.⁷ .............................................. H02K 13/00
(52) U.S. Cl. ...................................................... 310/248
(58) Field of Search ................................ 310/244, 248, 310/249, 239

(56) References Cited

U.S. PATENT DOCUMENTS

| | | | | |
|---|---|---|---|---|
| 1,301,922 A | * | 4/1919 | Endorf | 310/241 |
| 4,088,912 A | * | 5/1978 | Yoshida | 310/244 |
| 4,228,376 A | * | 10/1980 | Mabuchi | 310/242 |
| 4,368,398 A | * | 1/1983 | Mabuchi | 310/248 |

FOREIGN PATENT DOCUMENTS

| | | | | |
|---|---|---|---|---|
| JP | 10-032963 | * | 2/1998 | H02K/39/24 |
| JP | 10-32963 | * | 10/1998 | H02K/13/00 |
| JP | 11-69730 | * | 3/1999 | H02K/13/00 |

* cited by examiner

Primary Examiner—Thomas M. Dougherty
Assistant Examiner—Karen Addison
(74) Attorney, Agent, or Firm—Hogan & Hartson, LLP

(57) ABSTRACT

A DC motor with brushes includes a rotary shaft, an armature rotatable with the rotary shaft, a stator magnet disposed opposite to the armature, a commutator affixed on the side of the armature, and a pair of inside and outside brushes retained by a brush holder in a manner that the brushes are brought in contact with a peripheral surface of the commutator. The pair of brushes has an identical configuration. The outside brush is bent in a direction away from the other brush when the pair of the brushes is retained by the brush holder. The outside brush is further bend when in contact with the commutator. The inside brush has an end section extending toward an intermediate point of the outer brush in a longitudinal direction thereof. Each of the outside brush and the inside brush has a base section that is affixed to a terminal and an end section that is brought in contact with the commutator. The end section is bent with respect to the base section such that each of the outside brush and the inside brush defines a generally L-shape.

5 Claims, 9 Drawing Sheets

DC MOTOR WITH BRUSHES

BACKGROUND OF THE INVENTION

1. Field of the Invention

The present invention relates to a DC motor with brushes. More particularly, the present invention relates to the structure of brushes of a DC motor with brushes.

2. Description of Related Art

A typical DC motor with brushes has a brush holder 51 made of synthetic resin and a pair of brushes 55 and 56 retained by the brush holder 51, as shown in FIG. 9(A). Terminals 571 and 572 are connected to base sections of the respective pair of brushes 55 and 56. Required wirings are provided on the terminals 571 and 572. The pair of brushes 55 and 56 extend in directions that define an angle of 90° and are brought in flexible contact with an outer peripheral surface of a commutator 52. Throughout the present specification, in the case of the structure described above, the brush 55 that is located outside is referred to as an outside brush, and the brush 56 having an end section extending toward an intermediate section of the outside brush in a longitudinal direction is referred to as an inside brush.

The inside brush 56 is slightly shorter than the outside brush 55 so as not to interfere with the outside brush 55. In the prior art shown in this figure, the outside brush 55 is used for a positive pole and the inside brush 56 is used for a negative pole.

In the small sized DC motor with brushes thus structured, directions of the brushes 55 and 56 to be disposed and surfaces of the brushes to which the terminals 571 and 572 are attached are determined by several factors including, for example, rotational directions of the motor (the commutator 52). For example, in the motor shown in FIG. 9(A), the motor rotates in a counterclockwise direction as indicated by an arrow CCW. When the motor rotates in a counterclockwise direction, the brushes 55 and 56 are disposed in a manner that the commutator 52 rotates in directions toward the tips of the end sections of the brushes 55 and 56. Also, the terminals 571 and 572 are affixed to the brushes 55 and 56 on their surfaces that contact the commutator 52.

As shown in FIG. 9(B), when the motor rotates in a clockwise direction as indicated by an arrow CW, the positions of the brushes 55 and 56 are changed in a manner that the commutator 52 also rotates in a direction toward the tips of the end sections of the brushes 55 and 56. The terminals 571 and 572 are affixed to the opposite surfaces of the brushes 55 and 56 shown in FIG. 9(A).

In the brush structure used in the conventional DC motor with brushes, the inside brush 56 is designed to be shorter so that the outside brush 55 and the inside brush 56 do not interfere with each other. As a result, the brushes 55 and 56 for a positive pole and a negative pole cannot be formed from a common part. In fact, the brushes 55 and 56 should preferably be formed in the same size. There are delicate relations between the length of the brushes and contact points between the brushes and the commutator. Portions of the brushes that extend beyond the contact points on the commutator 22 are required to be in a specified ratio with respect to the entire length of the brushes. However, if the brushes are formed in the same size, the tip of the inside brush 56 contacts the outside brush 55 and thereby interference between the two brushes takes place.

If the inside brush 56 is made shorter, the tip portion of the inside brush 56 becomes too light. As a result, when the motor rotates at high speed, the tip section of the inside brush 56 tends to jump from the peripheral surface of the commutator 22, in other words, the tip section of the inside brush 56 tends to be separated from the peripheral surface of the commutator 22.

SUMMARY OF THE INVENTION

It is an object of the present invention to provide a DC motor with brushes in which positions of brushes on a brush holder are improved such that brushes for positive and negative poles can be formed from a common part.

In accordance with one embodiment of the present invention, a DC motor with brushes may include a rotary shaft, an armature rotatable with the rotary shaft, a stator magnet disposed opposite to the armature, a commutator affixed on the side of the armature, and a pair of brushes retained by a brush holder. The brushes are retained by the brush holder in a manner that the brushes are brought in contact with a peripheral surface of the commutator. In one aspect of the embodiment of the present invention, the pair of brushes has an identical shape. The pair of brushes is composed of an outside brush and an inside brush. The outside brush is bend in a direction in which the outside brush separates from the other brush when the pair of brushes is retained by the brush holder, and is brought in contact with the commutator. The inside brush has an end section extending toward an intermediate point of the outer brush in a longitudinal direction thereof. Each of the outside brush and the inside brush has a base section that is affixed to a terminal and an end section that is in contact with the commutator wherein the end section is bent with respect to the base section such that each of the brushes generally assumes a L-shape.

In accordance with the embodiment of the present invention, the pair of brushes does not interfere with one another. Therefore, one of the brushes does not have to be made shorter than the other brush to avoid interference between the two brushes. Accordingly, a pair of brushes having the same shape can be used, thus eliminating the time-consuming work for adjusting the brushes. Since positive and negative poles can be formed from common brushes, the parts management is readily performed.

Also, each of the outside brush and the inside brush has a base section to which a terminal is attached and an end section that is brought in contact with the commutator wherein the end section is bent with respect to the base section so that each of the brushes generally defines an L-shape. The use of the L-shaped brush allows an effective placement of the brushes within a small space.

In accordance with one embodiment of the present invention, the pair of brushes may be formed from an outside brush and an inside brush having an identical shape. An end section of the inside brush extends in a direction pointing toward an intermediate section of the outside brush in a longitudinal direction. When such inside brush and outside brush are used, the brush holder may preferably have a protrusion that comes in contact with the outside brush and outwardly bends the outside brush so that the outside brush does not contact the inside brush when the outside brush is mounted on the brush holder and before the commutator is attached to the brush holder. With this structure, the outside brush outwardly bends when the outside brush is attached to the brush holder. As a result, even when the inside brush and the outside brush have the same size, the brushes do not interfere with each other before the commutator is disposed. Although the inside brush extends toward the outside brush, common brushes can be used as a pair. Also, the inside brush does not have to be made shorter, and therefore the end section of the brush can be made heavier. As a consequence, the brush continues to contact the peripheral surface of the commutator and does not jump.

In accordance with another embodiment of the present invention, the pair of brushes are positioned in a fan-like manner so that the pair of brushes open at an angle between 93° and 115° when the pair of brushes are mounted on the brush holder and before the commutator is disposed inside the pair of brushes. With this structure, when the commutator is disposed, the pair of brushes disposed in a fan-like manner are further opened and bent. Therefore, the brushes do not interfere with each other, and common brushes can be used as a pair.

In accordance with the present invention, the end sections of the pair of brushes may preferably be bent outwardly. For example, when the pair of brushes are mounted on the brush holder, the end sections of the pair of brushes outwardly bent at an angle of (180−D/2)°, where D° is an interior angle defined by the pair of brushes before the commutator is disposed inside the pair of brushes. With this structure, the end sections of the brushes can be extended, such that the end sections of the brushes become heavier. As a result, the brushes are maintained in contact with the peripheral surface of the commutator and do not jump from the commutator when the motor rotates at high speed.

Other features and advantages of the invention will be apparent from the following detailed description, taken in conjunction with the accompanying drawings that illustrate, by way of example, various features of embodiments of the invention.

DESCRIPTION OF PREFERRED EMBODIMENTS

DC motors with brushes in accordance with the present invention are described below with reference to the accompanying drawings.

Figure 1:
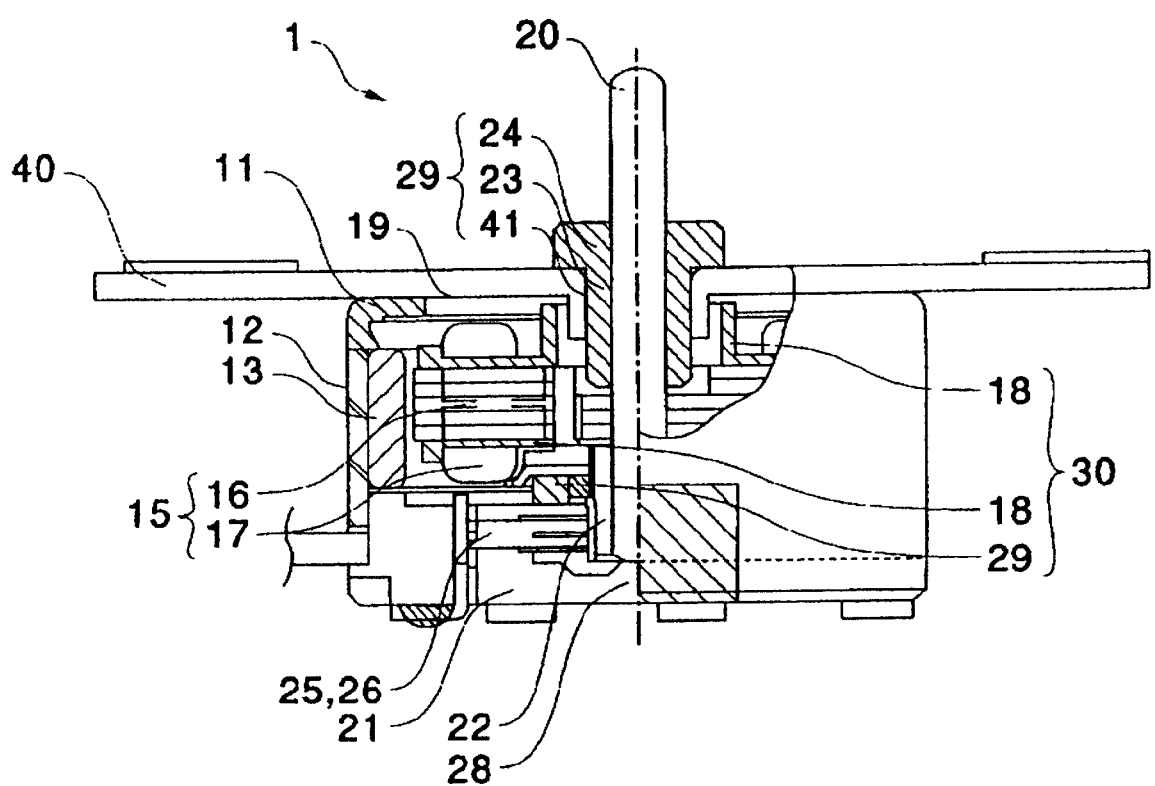
FIG. 1 is a partially cutout side view of a DC motor with brushes in accordance with a first embodiment of the present invention.
Figure 2:
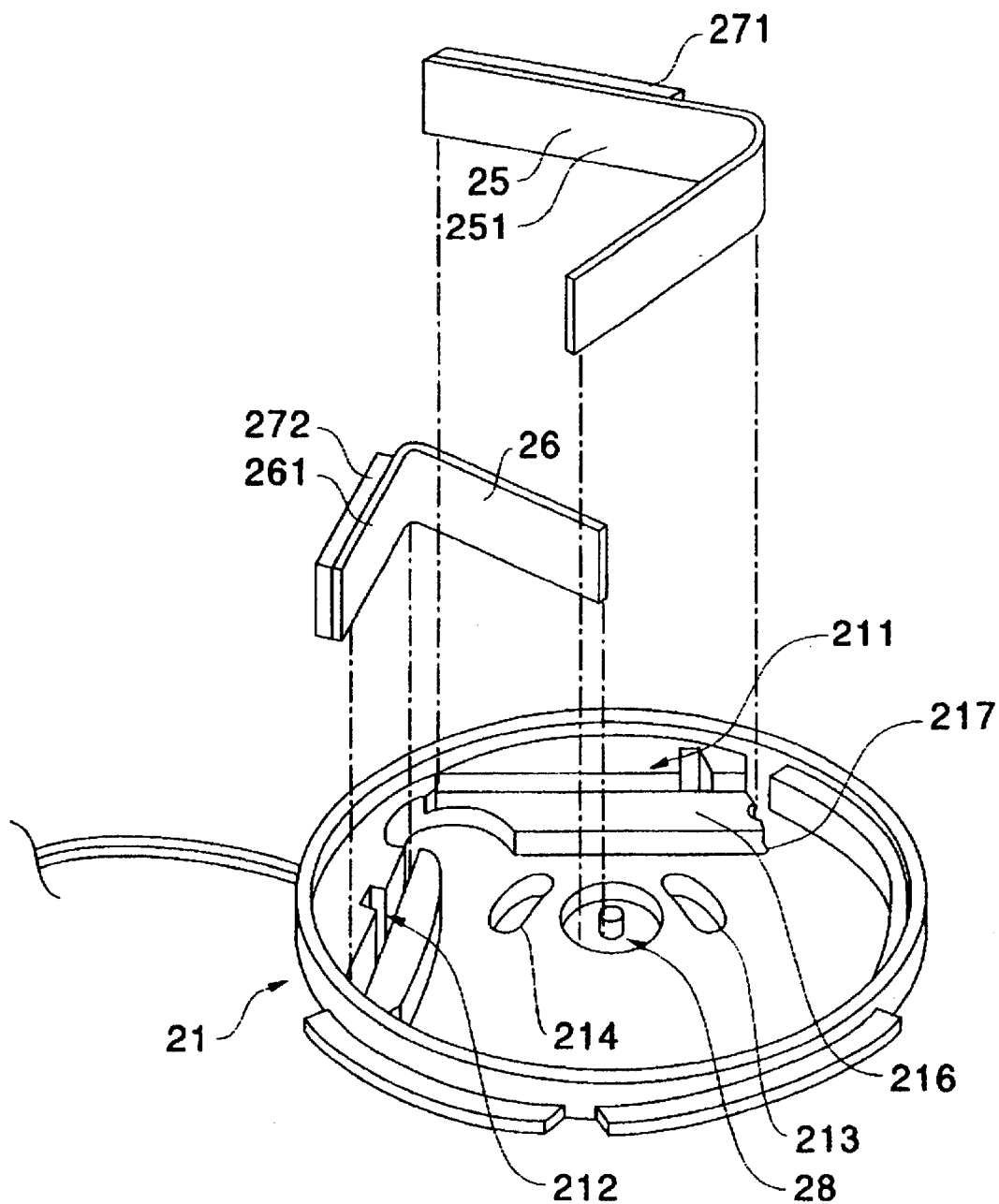
FIG. 2 is a perspective exploded view of the DC motor with brushes shown in FIG. 1 before brushes are mounted on a brush holder.
Figure 3:
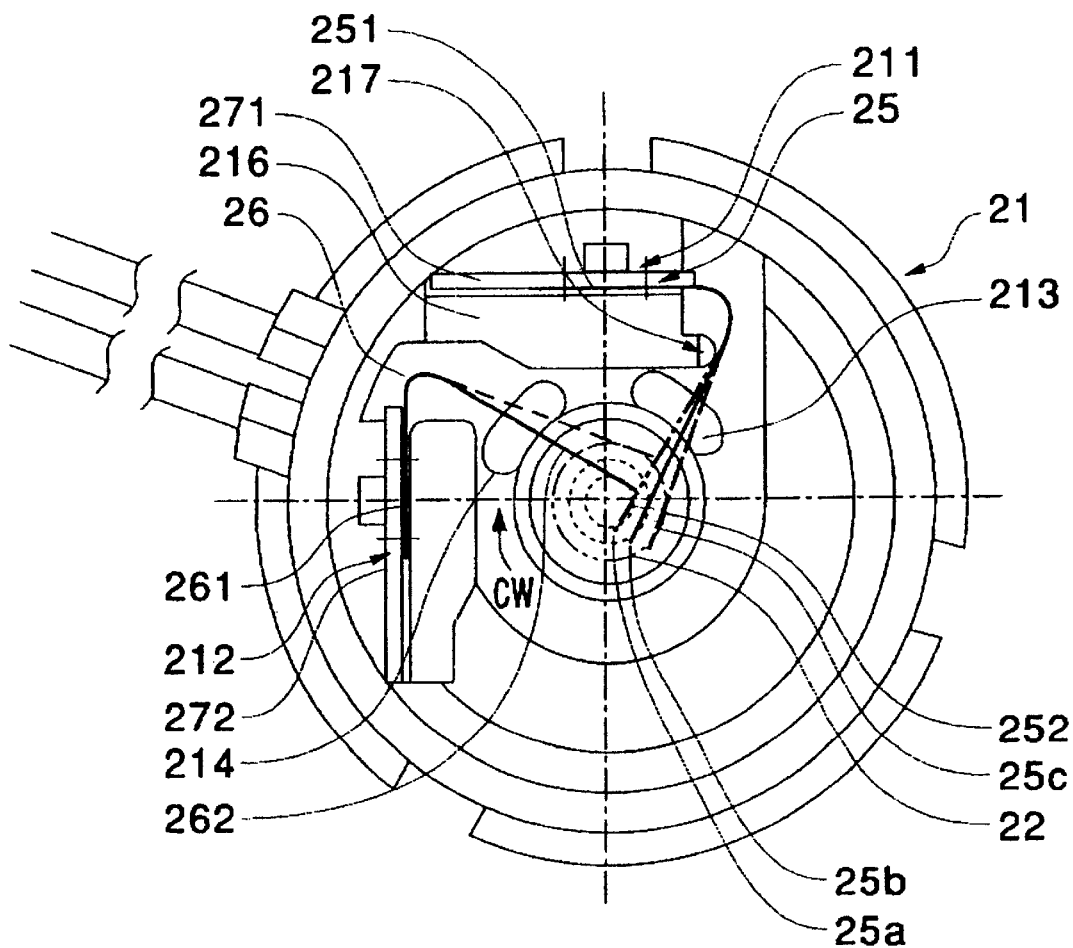
FIG. 3 is a plan view of the DC motor with brushes shown in FIG. 1 when the brushes are mounted on the brush holder.

FIG. 1 is a partially cutout side view of a DC motor with brushes 10 in accordance with a first embodiment of the present invention. FIG. 2 is a perspective exploded view of the DC motor with brushes 10 before brushes are mounted on a brush holder. FIG. 3 is a plan view of the DC motor with brushes 10 when the brushes are mounted on the brush holder.

As shown in FIG. 1, the DC motor with brushes 10 of the present embodiment includes a cup-like motor case 11, a motor main body 30 with a rotary shaft 20 in which an output end side of the rotary shaft 20 protrudes from an upper surface of the motor case 11, and a mounting plate 40 that is affixed to the motor case 11 by an appropriate method such as welding in a manner to cover the upper surface of the motor case 11. The mounting plate 40 corresponds, for example, to a mounting section of the motor main body 30 that is attached to a motor mounting section of a disc drive apparatus.

An armature 15 is provided within the motor case 11. The armature 15 is formed from six salient cores 16 fixed to the rotary shaft 20 about its center section along an axis of the rotary shaft 20 by a pressure insertion method or the like, insulation spacers 18 disposed over the cores 16, and coils 17 that are wound around the respective salient cores 16 over the insulation spacers 18. Accordingly, the armature 15 rotates together with the rotary shaft 20. On the other hand, permanent magnets 13 (stator magnets) magnetized with four poles and disposed in a ring configuration are attached to an internal surface of a side plate section 12 of the cup-like motor case 11. The permanent magnets 13 are spaced a predetermined distance from external surfaces of the salient cores 16 in a manner that the permanent magnets 13 are opposite to the external surfaces of the salient cores 16.

The rotary shaft 20 is supported at its base end section by a thrust bearing 28 that is an integral part of a brush holder 21. The output end side of the rotary shaft 20 is rotatably supported by a radial bearing 29. A commutator 22 is formed in the bottom end section of the rotary shaft 20, and a varistor 29 is mounted at a position adjacent to the commutator 22. Brushes 25 and 26 made from a material clad with a precious metal are retained by the brush holder 21, and come in contact with the commutator 22.

The radial bearing 29 is not retained on the upper surface of the motor case 11. Instead, a shaft-withdrawing aperture 19 is formed in the upper surface of the motor case 11. Therefore, the output end section of the rotary shaft 20 extends upward through the shaft-withdrawing aperture 19. The shaft-withdrawing aperture 19 is a relatively large hole formed for taking out the output end side of the rotary shaft 20, and opens in an area overlapping the winding portions of the coils 17 within the motor case 11. More particularly, the shaft-withdrawing aperture 19 is provided around the center of the upper surface of the motor case 11 and has an aperture diameter that is slightly larger than the outer diameter of the winding portions of the coils 17. Therefore, upper sections of the coils 17 directly oppose to a lower surface of the mounting plate 40 through the shaft-withdrawing aperture 19.

In accordance with the present embodiment, the radial bearing 29 is affixed to a bearing retaining hole 41 that is formed in the center of the mounting plate 40 by a pressure insertion method or the like. The bearing retaining hole 41 is defined by a sleeve section that extends toward the inside of the motor case 11, which is formed at the center section of the mounting plate 40 by a burring process. The radial bearing 29 includes a cylindrical body section 23 that retains the rotary shaft 20 and a flange 24 that extends outwardly at an upper end of the body section 23. The body section 23 extends downwardly through the shaft-withdrawing aperture 19 of the motor case 11, and a lower half section of the body section 23 is located within the motor case 11. The flange section 24 partially covers the upper surface of the mounting plate 40.

In accordance with the present embodiment, the brush holder 21 and the brushes 25 and 26 are structured in a manner shown in FIGS. 2 and 3. First, the brush holder 21 is formed from a synthetic resin in the shape of a disc. A central section of the brush holder 21 defines a thrust bearing 28 that supports the rotary shaft 20 (as shown in FIG. 1). Therefore, a commutator 22 is positioned in the central section.

The brush holder 21 has a thick portion and slit-like brush affixing sections 211 and 212 for retaining the two brushes 25 and 26 that are formed in the thick portion at locations generally equidistant from the center of the brush holder 21. The brush affixing sections 211 and 212 retains base sections 251 and 261 of the brushes 25 and 26 at which thin plate terminals 271 and 272 are attached. Each of the brush affixing sections 211 and 212 has a slit width that is generally equal to a thickness of each of the brushes 25 and 26 plus a thickness of each of the terminals 271 and 272. Therefore, the brushes 25 and 26 are attached to the brush holder 21 by pressure inserting the base sections 251 and 261 of the brushes 25 and 26 in the brush affixing sections 211 and 212.

Through-holes 213 and 214 are formed in the brush holder 21 at positions overlapping the brushes 25 and 26 when the brushes 25 and 26 are mounted on the brush holder 21.

The brush holder 21 includes a protruded section 216 inside the brush affixing section 211. A protrusion 217 is formed on one end of the protruded section 216 on the side where the end section 252 of the brush 25 extends. As will be described below, the protrusion 217 abuts to the end section 252 of the brush 25 adjacent a bottom section of the end section 252 to thereby bend the brush 25.

The brushes 25 and 26 are provided for positive pole and negative pole, respectively. In the present embodiment, the pair of the brushes 25 and 26 has an identical shape, and the terminals 271 and 272 are affixed to outside surfaces of the base sections 251 and 261 of the brushes 25 and 26, respectively. Also, the end sections 252 and 262 of the pair of the brushes 25 and 26 that come in contact with the commutator 22 are bent with respect to the base sections 251 and 261. In other words, each of the brushes 25 and 26 has an L-shape.

The brushes 25 and 26 are installed in the DC motor with brushes 10 having the structure describe above as follows.

The terminals 271 and 272 are affixed to the outside surfaces of the base sections 251 and 261 of the brushes 25 and 26 by an appropriate method including caulking, and then the base sections 251 and 261 are pressure-inserted in the brush affixing sections 211 and 212 of the brush holder 21.

As a result, the brush 26 that is an inside brush is mounted on the brush holder 21 while maintaining its shape. On the other hand, the brush 25 that is an outside brush, which is bent as indicated by a two-dot-and-dash line 25a of FIG. 3 before it is mounted on the brush holder 21, bents as indicated by a solid line 25b by the protrusion 217 that abuts to the inner surface of the end section 252 adjacent a bottom section thereof.

After the brushes 25 and 26 are mounted at predetermined positions on the brush holder 21, pins (not shown) are inserted through the through-holes 213 and 214 to push and outwardly flex the end sections of the brushes 25 and 26, and in this state, the commutator 22 is disposed.

As a result, the end sections of both of the brushes 25 and 26 are bent outwardly, one surfaces (i.e., inside surfaces) of the end sections of the brushes 25 and 26 are brought in contact with the peripheral surface of the commutator 22 in directions perpendicular to each other. In this instance, the brush 25 (outside brush) in its bent state is further bent as indicated by a broken line 25c and brought into contact with the peripheral surface of the commutator 22. In this state, the end sections 252 and 262 of the pair of the brushes 25 and 26 are separated from each other with a distance of 0.3 mm to 3.0 mm, for example.

In accordance with the present embodiment, the brush 25 (outside brush) is bent by the protrusion 217 by a specified amount from its original configuration. The specified amount is about one half (½) of a bending amount of the brush 25 that is bent by the commutator 22 from its original configuration (the configuration before the brush 25 is attached to the brush holder 21).

In this manner, the DC motor with brushes 10 in which the pair of the brushes 25 and 26 are brought in contact with the peripheral surface of the commutator 22 is assembled. In this embodiment, the motor rotates in a clockwise direction as indicated by an arrow CW in FIGS. 2 and 3, and the commutator 22 rotates in a direction towards the edges of the end sections 252 and 262 of the brushes 25 and 26, not in a direction against the edges of thereof.

In the DC motor with brushes 10 of the present embodiment, a pair of the brushes 25 and 26 are brought in contact with the commutator 22 in a manner that the brush 25 is flexed in a direction away from the other brush 26, and therefore the brushes 25 and 26 do not interfere with each other. Accordingly, one of the brushes 25 and 26 does not have to be made shorter to avoid the interference between the two brushes 25 and 26. As a result, the brushes 25 and 26 having the same configuration can be used as a pair, and therefore brushes for positive and negative poles are formed from common parts. This makes parts management easier.

In particular, in the structure in which an inside brush, that is the brush 26, among a pair of the brushes 25 and 26, extends toward an outside brush (the brush 25), there may be a problem of interference between the brushes 25 and 26 when the brushes 25 and 26 are mounted on the brush holder 21. However, in accordance with the present embodiment, the brush holder 21 is formed with the protrusion 217 that comes in contact with and outwardly flexes the brush 25 before the commutator 22 is disposed within the brushes 25 and 26. As a result, the brush 25 bends outwardly (in a direction away from the brush 26) when attached to the brush holder 21. Therefore, the brushes 25 and 26 do not interfere with each other even when the brushes 25 and 25 having the same size are used as a pair. Accordingly, identical parts can be used as a pair of the brushes 25 and 26 even in the structure in which the brush 26 extends toward the brush 25.

Further, since the brush 26 (inside brush) can be made longer compared with the conventional structure, the end side of the brush 26 can be accordingly made heavier. As a result, the brush 26 is maintained to be in contact with the peripheral surface of the commutator 22 and does not jump therefrom even when the motor rotates at high speed.

Furthermore, in accordance with the present embodiment, each of the brushes 25 and 26 is bent in an L-shape, and therefore the brushes 25 and 26 can be effectively disposed in a relatively small space. Also, the terminals 271 and 272 are affixed to the base sections 251 and 261 of the bent brushes 25 and 26, respectively. As a result, a force generated by the rotation of the motor does not reach the portions where the terminals 271 and 272 are affixed to the brushes 25 and 26. Therefore, the terminals 271 and 272 attached on one surface of the brushes 25 and 26 do not have to be changed to the other depending on the rotational direction of the motor. Accordingly, the brushes 25 and 26 with the terminals 271 and 272 attached thereto can be commonly used for either the positive pole or the negative pole.

Figure 4A:
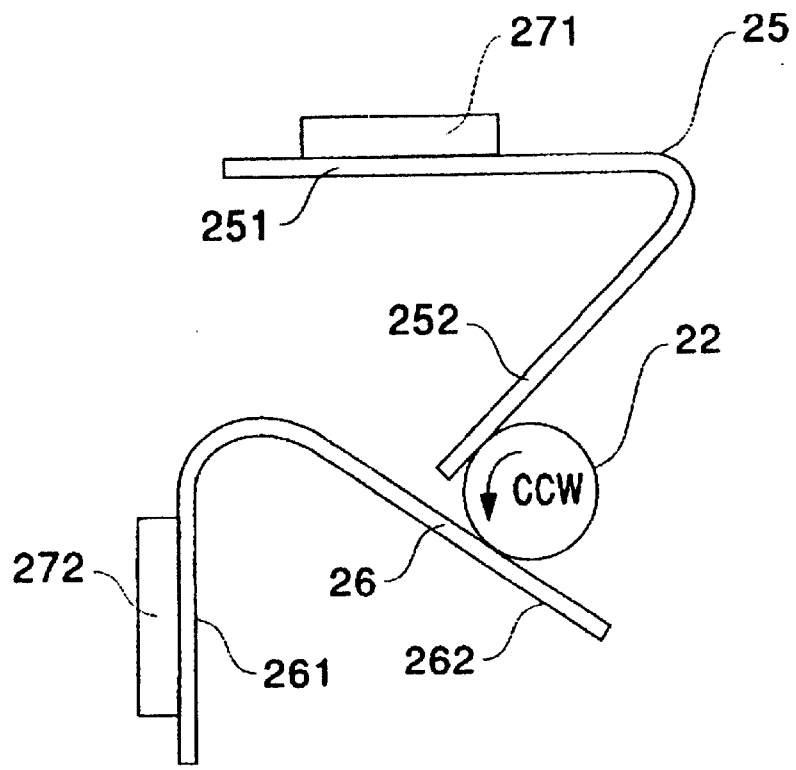
FIGS. 4(A) and 4(B) are illustrations to explain the relations between the brushes and the commutator of the DC motor with brushes shown in FIG. 1 when the motor is rotated in a reverse direction while the basic structure of the DC motor with brushes is maintained unchanged.

In other words, when the motor rotates in a counterclockwise direction (in a direction indicated by an arrow CCW) as shown in FIG. 4(A), the brushes 25 and 26 with the terminals 271 and 272 attached to the outside surfaces of their base sections 251 and 261, which are described with reference to FIGS. 2 and 3, may be used by merely disposing in different orientations, such that the commutator 22 are brought in contact with outside surfaces of the end sections 252 and 262 of the brushes 25 and 26. In the configuration shown in FIG. 4, the brush 26 is an outside brush. Therefore, a protrusion similar to the protrusion 217 described with reference to FIGS. 2 and 3 may be provided for the brush 26, such that the brush 26 is flexed in a direction away from the brush 25.

Figure 4B:
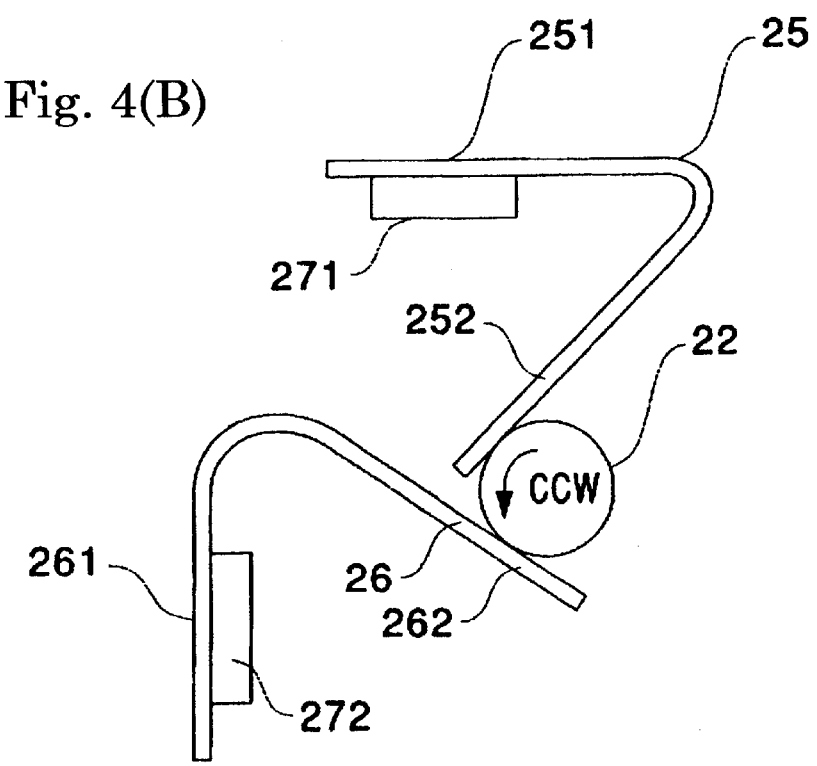

When the motor rotates in a counterclockwise direction (in a direction indicated by an arrow CCW) as shown in FIG. 4(B), and terminals 271 and 272 are affixed to internal surfaces of the base sections 251 and 252 of the brushes 25 and 26, the brushes 25 and 26 themselves can be used as they are, as described with reference to FIGS. 2 and 3. Accordingly, there are advantages in that the brushes 25 and 26 can be commonly used for either the positive pole or the negative pole without regard to whether the motor rotates in clockwise direction or counterclockwise direction.

Figure 5:
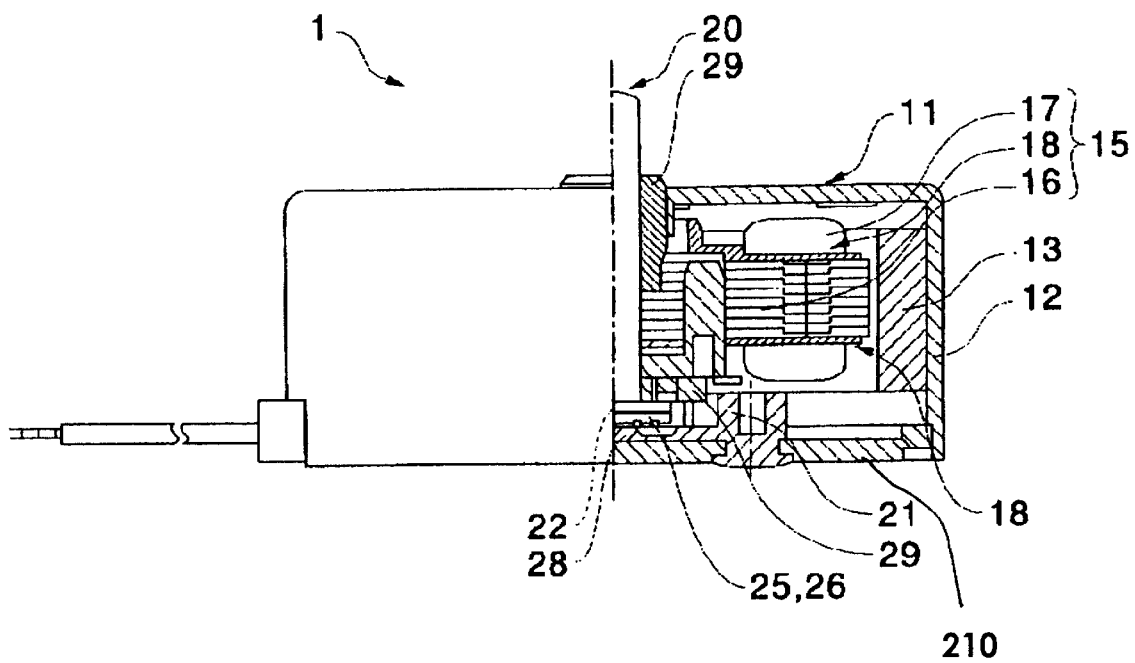
FIG. 5 is a partially cutout side view of a DC motor with brushes in accordance with a second embodiment of the present invention.
Figure 6:
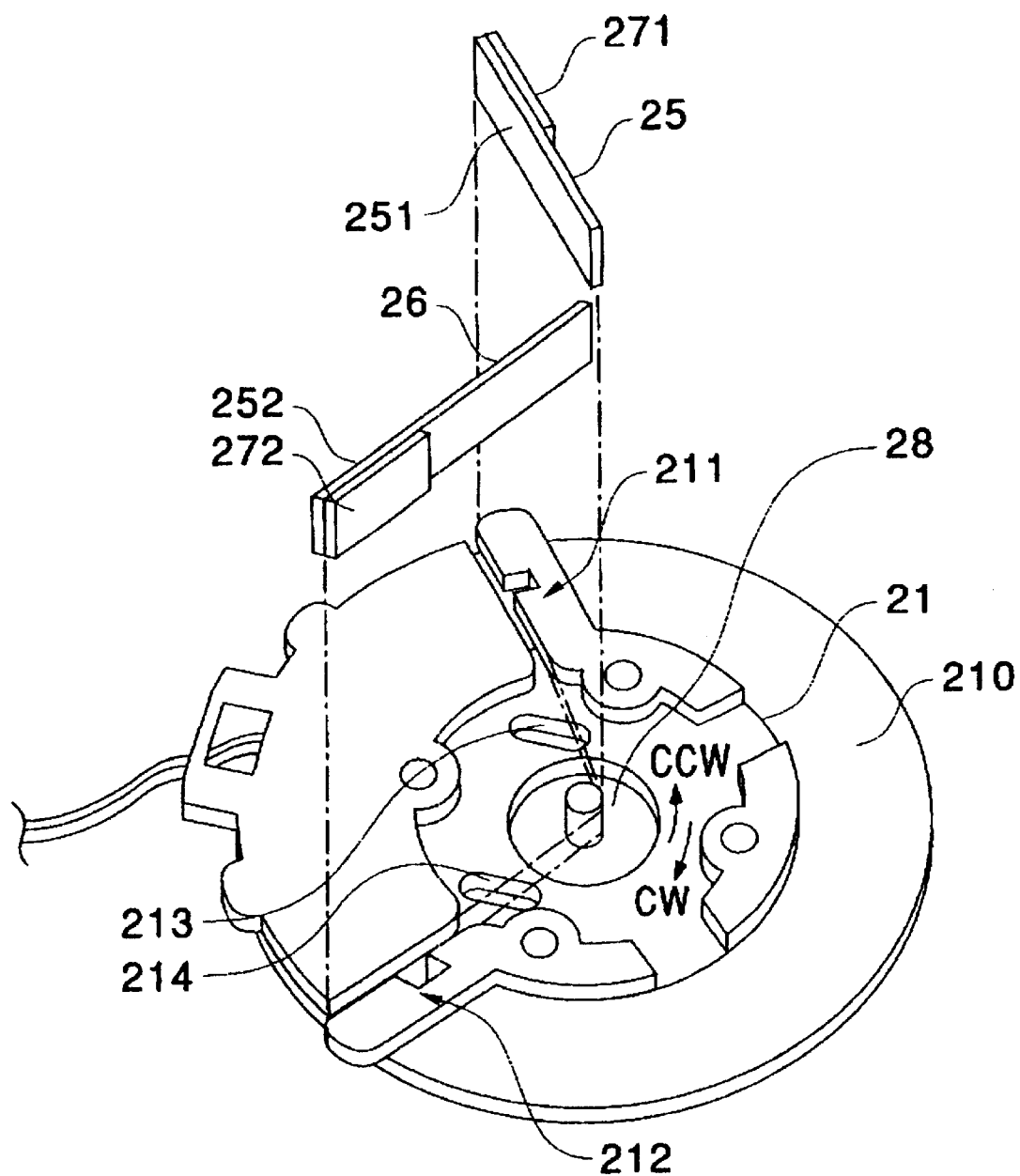
FIG. 6 is a perspective exploded view of the DC motor with brushes shown in FIG. 5 before brushes are mounted on a brush holder.
Figure 7:
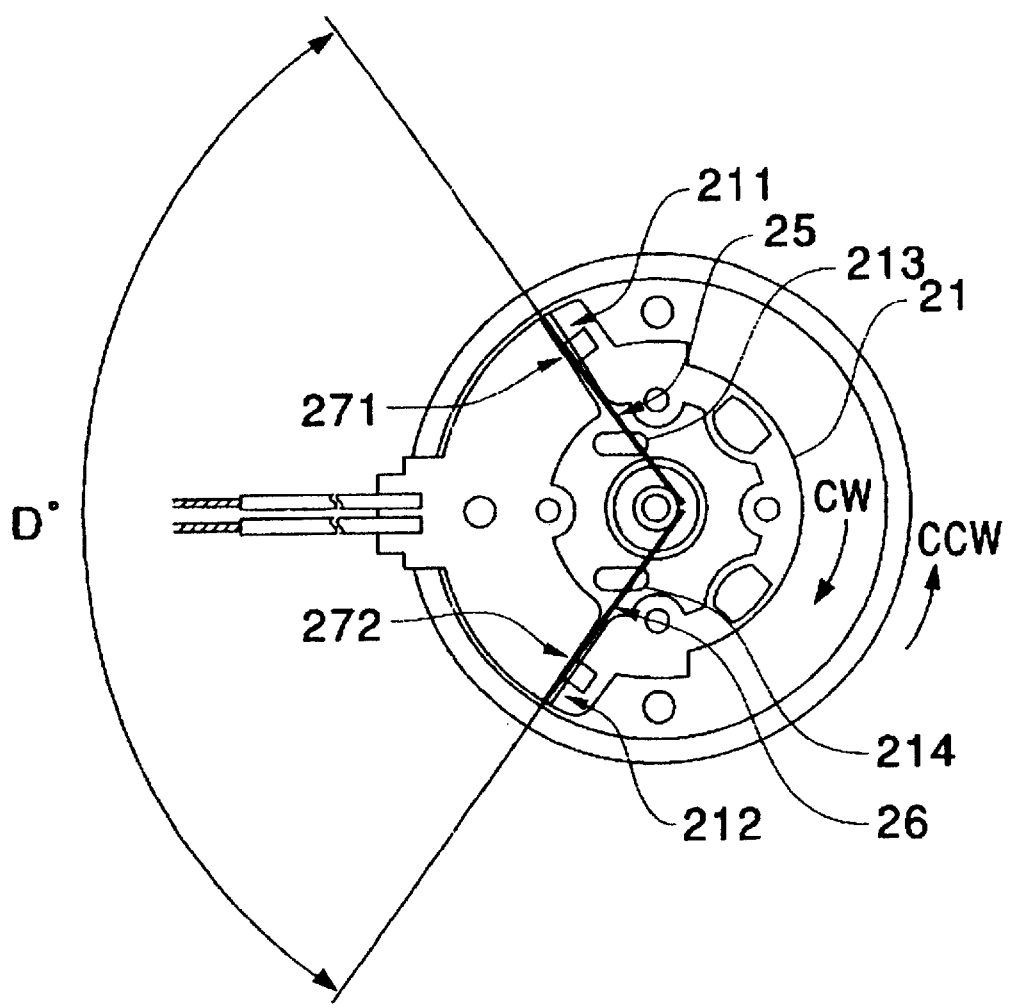
FIG. 7 is a plan view of the DC motor with brushes shown in FIG. 5 when the brushes are mounted on the brush holder.

FIG. 5 is a partially cutout side view of a DC motor with brushes 10 in accordance with a second embodiment of the present invention. FIG. 6 is a perspective exploded view of the DC motor with brushes 10 before brushes are mounted on a brush holder. FIG. 7 is a plan view of the DC motor with brushes 10 when the brushes are mounted on the brush holder. It is noted that the basic structure of the DC motor with brushes of the present embodiment is the same as that of the DC motor of the first embodiment. Accordingly, elements having common functions are marked with the same reference.

As shown in FIG. 5, the DC motor with brushes 10 of the present embodiment includes a cup-like motor case 11. An output end side of a rotary shaft 20 protrudes from an upper surface of the motor case 11. An armature 15 is provided within the motor case 11. The armature 15 is formed from six salient cores 16 affixed to the rotary shaft 20 about its center section along an axis of the rotary shaft 20 by a pressure insertion method or the like, insulation spacers 18 disposed over the cores 16, and coils 17 that are wound around the respective salient cores 16 over the insulation spacers 18. Accordingly, the armature 15 rotates together with the rotary shaft 20. Permanent magnets 13 (stator magnets) magnetized with four poles and disposed in a ring configuration are attached to an internal surface of a side plate section 12 of the cup-like motor case 11. The permanent magnets 13 are spaced a predetermined distance from external surfaces of the salient cores 16 in a manner that the permanent magnets 13 are opposite to the external surfaces of the salient cores 16.

The rotary shaft 20 is supported at its base end section by a thrust bearing 28 that is an integral part of a brush holder 21. The output end side of the rotary shaft 20 is rotatably supported by a radial bearing 29. A commutator 22 is formed in the bottom end section of the rotary shaft 20, and a varistor 29 is mounted at a position adjacent to the commutator 22. Brushes 25 and 26 made from an appropriate material, such as a material clad with a precious metal are retained by the brush holder 21, and brought in contact with the commutator 22. A metal substrate 210 is attached to a lower surface of the brush holder 21.

In accordance with the present embodiment, the brush holder 21 and the brushes 25 and 26 are structured in a manner shown in FIGS. 6 and 7.

First, the brush holder 21 is formed from an appropriate material, preferably a synthetic resin, in the shape of a disc. A central section of the brush holder 21 defines a thrust bearing 28 that supports the rotary shaft 20 (as shown in FIG. 6). Therefore, a commutator 22 is positioned in the central section.

The brush holder 21 has a thick portion and slit-like brush affixing sections 211 and 212 for retaining the two brushes 25 and 26 that are formed in the thick portion at locations equidistant from the center of the brush holder 21. The brush affixing sections 211 and 212 retains base sections 251 and 261 of the brushes 25 and 26 at which thin plate terminals 271 and 272 are attached. Each of the brush affixing sections 211 and 212 has a slit width that is generally equal to a thickness of each of the corresponding brushes 25 and 26 plus a thickness of each of the corresponding terminals 271 and 272. Therefore, the brushes 25 and 26 are attached to the brush holder 21 by pressure inserting the base sections 251 and 261 of the brushes 25 and 26 in the brush affixing sections 211 and 212.

Through-holes 213 and 214 are formed in the brush holder 21 at positions overlapping the brushes 25 and 26 when the brushes 25 and 26 are mounted on the brush holder 21.

The brushes 25 and 26 are provided for a positive pole and a negative pole, respectively. In accordance with the present embodiment, the brushes 25 and 26 are respectively formed from rectangular thin plates that extend straight and have identical shape and size.

The brushes 25 and 26 are installed in the DC motor with brushes 10 having the structure describe above as follows.

The terminals 271 and 272 are affixed to the base sections 251 and 261 of the brushes 25 and 26 by an appropriate method such as caulking, and then the base sections 251 and 261 are pressure-inserted in the brush affixing sections 211 and 212 of the brush holder 21. As a result, the brushes 25 and 26 are mounted on the brush holder 21, positioned in a fan-like manner. The brushes 25 and 26 define an angle D that is between 93° and 115°. In this state, the terminals 271 and 272 are positioned on the outside of the brushes 25 and 26.

After the brushes 25 and 26 are mounted on the brush holder 21, pins (not shown) are inserted through the through-holes 213 and 214 to push and outwardly flex the end sections of the brushes 25 and 26, and in this state, the commutator 22 is disposed.

As a result, the end sections of both of the brushes 25 and 26 are bent outwardly, and one surfaces (i.e., inside surfaces) of the end sections of the brushes 25 and 26 are brought in contact with the peripheral surface of the commutator 22 in directions generally perpendicular to each other. In this state, the end sections 252 and 262 of the pair of the brushes 25 and 26 are separated from each other with a distance of about 0.3 mm to 3.0 mm.

In this manner, the DC motor with brushes 10 is assembled in a manner that a pair of the brushes 25 and 26 are brought in contact with the peripheral surface of the commutator 22. In this embodiment, the motor rotates in a clockwise direction as indicated by an arrow CW in FIGS. 6 and 7.

In the DC motor with brushes 10 of the present embodiment, a pair of the brushes 25 and 26 are brought in contact with the commutator 22 in a manner that the brushes 25 and 26 are flexed in directions in which the brushes 25 and 26 are separated from each other, compared with a state in which the brushes 25 and 26 are positioned in a fan-like manner. Therefore the brushes 25 and 26 do not interfere with each other. Accordingly, one of the brushes 25 and 26 does not have to be made shorter to avoid the interference between the two brushes 25 and 26. As a result, the brushes 25 and 26 having the same configuration can be used as a pair, and therefore brushes for positive and negative poles are formed from common parts. This makes parts management easier.

Also, the brushes 25 and 26 can be formed in the same size, and one of the brushes 25 and 26 is not lighter than the other brush. Therefore, there is not such an incident that a lighter brush jumps from the peripheral surface of the commutator 22.

Also, in accordance with the present embodiment, the structure of the DC motor described with reference to FIGS. 6 and 7 can be maintained unchanged without regard to whether the motor rotates in a clockwise direction (in a direction indicated by an arrow CW) or in a counterclockwise direction (in a direction indicated by an arrow CCW). In other words, in what orientations the brushes 25 and 26 are to be affixed to the brush holder, and the terminals 271 and 272 to the brushes 25 and 26, and the positions and orientations of these parts do not have to be changed.

Figure 8:
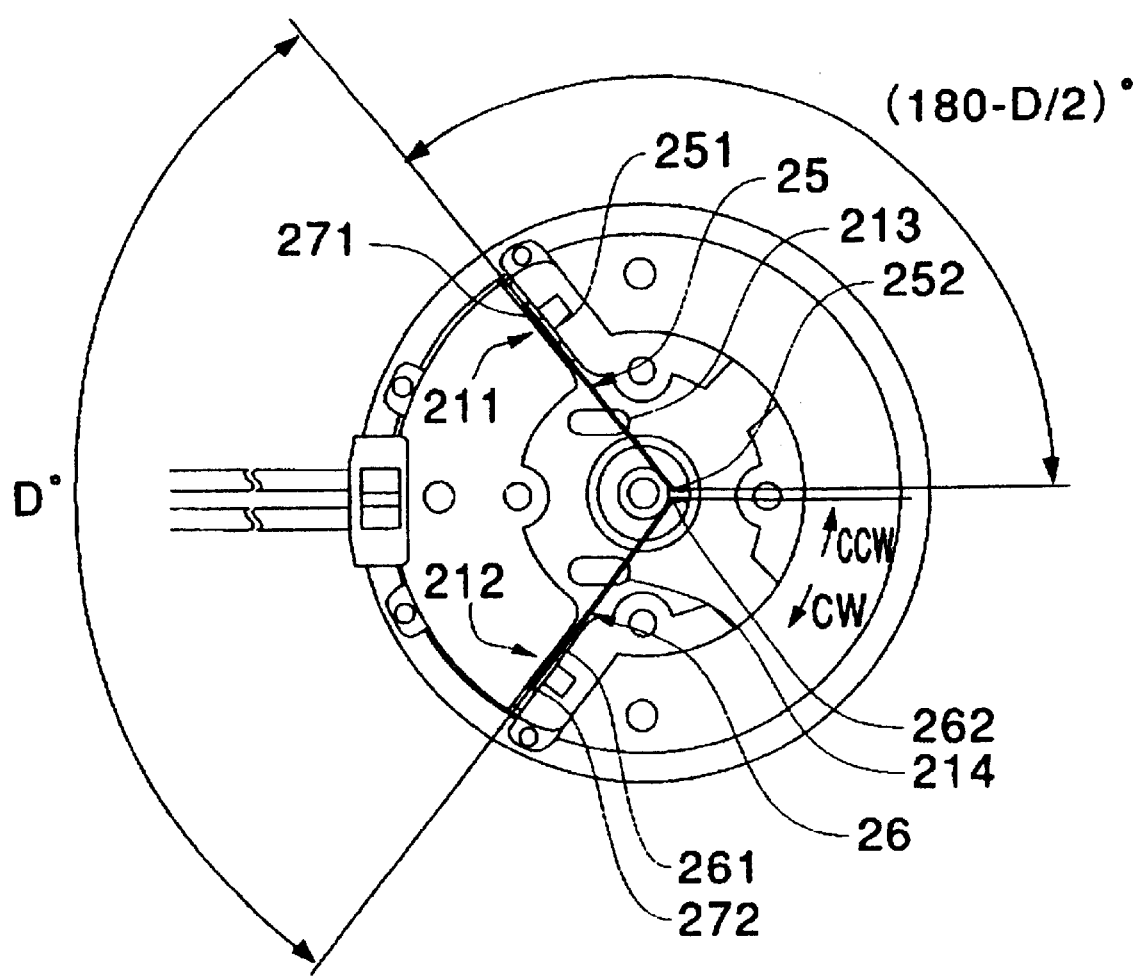
FIG. 8 is a plan view of a DC motor with brushes in accordance with a modification example of the second embodiment when brushes are mounted on a brush holder.
Figure 9A:
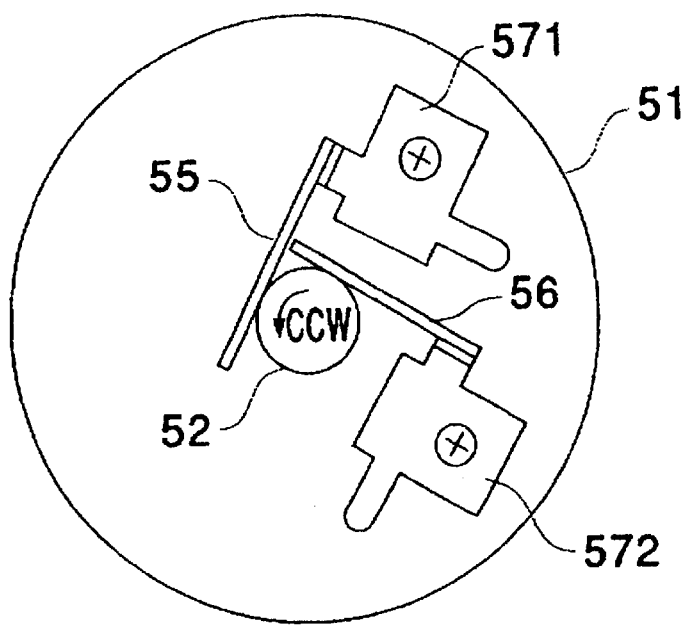
FIGS. 9(A) and 9(B) are illustrations to explain the relations between brushes and a commutator of a conventional DC motor with brushes.
Figure 9B:
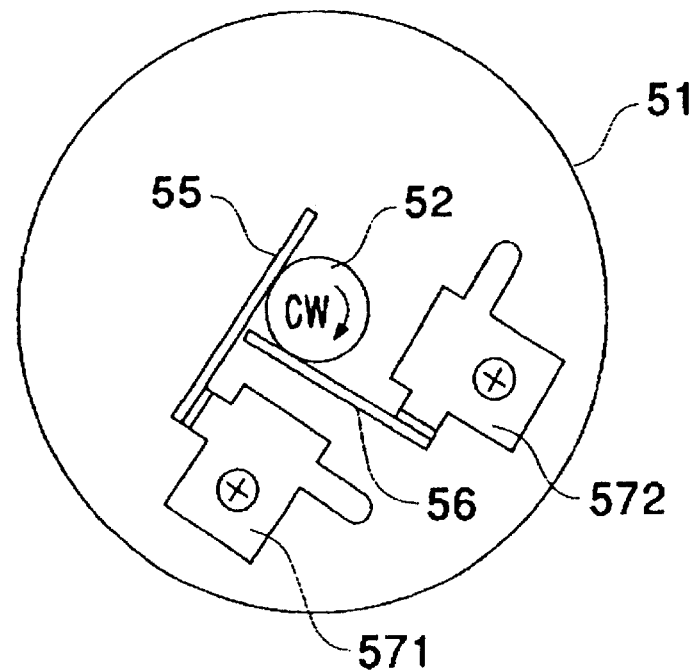

In the second embodiment, the brushes 26 and 26 are straight. However, as shown in FIG. 8, the end sections 252 and 262 of the respective brushes 25 and 26 may preferably be bent outwardly. For example, when the brushes 25 and 26 are mounted on the brush holder 21 and before the inside surfaces of the brushes 25 and 26 are brought in contact with the commutator 22, the brushes 25 and 26 define an interior angle D°, and each of the end sections 252 and 262 of the brushes 25 and 26 outwardly bends at an angle of (180–D/2)°. In one embodiment, each of the end sections 252 and 262 of the first and second brushes 25 and 26 extend generally in parallel with one another. Each of the end sections 252 and 262 bents at an angle of (180–D/2)° with respect to the straight section of each of the first and second brushes 25 and 26, where Do is an interior angle defined by the first and second brushes 25 and 26 before the commutator 22 is disposed inside the first and second brushes 25 and 26.

In accordance with the present embodiment, the end sections 252 and 262 of the brushes 25 and 26 are equally extended, and thus the end sections of the brushes 25 and 26 can be made equally heavier. As a result, the brushes 25 and 26 are maintained in contact with the peripheral surface of the commutator 22 and do not jump therefrom.

As described above, a DC motor with brushes in accordance with the present invention can be manufactured in a manner that a pair of brushes having an identical configuration does not interfere with each other. One of the brushes does not have to be made shorter to avoid the interference between the two brushes. As a result, the brushes having the same configuration can be used as a pair, and therefore brushes for positive and negative poles are formed from common parts. This makes parts management easier.

Also, each of the outside brush and the inside brush has a base section to which a terminal is attached and an end section that is brought in contact with the commutator wherein the end section is bent from the base section in an L-shape. The use of the L-shaped brush allows an effective placement of the brushes within a small space.

In accordance with the present invention, the pair of brushes are positioned in a fan-like manner so that the pair of the brushes open at an angle between 93° and 115° when the pair of the brushes are mounted on the brush holder and in a state before the commutator is disposed inside the pair of the brushes. With this structure, when the commutator is disposed, the pair of the brushes disposed in a fan-like manner are further opened and bent outwardly. Therefore, the brushes do not interfere with each other, and brushes having an identical configuration and size can be used as a pair.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A DC motor comprising:

a rotary shaft;

an armature rotatable with the rotary shaft;

a stator magnet disposed opposite to the armature;

a commutator affixed adjacent the armature;

a brush holder; and a pair of brushes retained by the brush holder in a manner that the brushes contact a peripheral surface of the commutator;

wherein each of the pair of brushes has an identical shape;

wherein the pair of brushes is positioned in a fan-like manner so that the pair of brushes open at an angle between 93° and 115° when the pair of brushes is mounted on the brush holder but before the commutator is disposed inside the pair of brushes;

wherein the brush holder is generally circular and has a thick section and a pair of slit-like brush affixing sections formed in the thick section for retaining the pair of brushes at positions equidistant from a center of the brush holder, wherein each of the slit-like brush affixing sections has a slit width generally equal to a thickness of each of the brushes plus a thickness of a terminal to be affixed to each of the brushes;

wherein the pair of brush affixing sections is formed in directions extending toward the center of the brush holder, and the brush affixing sections are disposed in a fan-like manner such that the brush affixing sections open with respect to one another at an angle between 93° and 115°;

wherein the brush holder has a thinner section defining through-holes positioned on extension lines of the brush affixing sections such that the brushes can be reached from outside through the through-holes.

2. A DC motor according to claim 1, wherein the pair of brushes have end edges that are separated from one another at a distance between 0.3 mm and 3.0 mm when the brushes are in contact with the commutator.

3. A DC motor comprising:

a rotary shaft;

an armature rotatable with the rotary shaft;

a stator magnet disposed opposite the armature;

a commutator affixed adjacent the armature;

a brush holder; and a pair of brushes retained by the brush holder so that the brushes contact a peripheral surface of the commutator;

wherein each of the pair of brushes has an identical shape;

wherein the pair of brushes is positioned in a fan-like manner so that the pair of brushes open at an angle between 93° and 115° when the pair of brush is mounted on the brushes holder but before the commutator is disposed inside the pair of brushes;

wherein the brush holder is generally circular and has a thick section and a pair of slit-like brush affixing sections formed in the thick section for retaining the pair of brushes at positions equidistant from a center of the brush holder; and wherein each of the slit-like brush affixing sections has a slit width generally equal to a thickness of each of the brushes plus a thickness of a terminal to be affixed to each of the brushes; and wherein the brush holder has thinner section defining through-holes positioned on extension lines of the brush affixing sections such that the brushes can be reached from outside through the through-holes.

4. A DC motor according to claim 3, wherein the pair of brushes have end edges that are separated from one another at a distance between 0.3 mm and 3.0 mm when the brushes are in contact with the commutator.

5. A DC motor comprising:

a rotary shaft;

an armature mounted on the rotary shaft;

a stator magnet disposed opposite to the armature;

a commutator affixed adjacent to the armature;

a pair of first and second brushes having an identical configuration and an identical size, each of the first and second brushes having a base section and an end section that is flexible with respect to the base section; and a brush holder including a pair of brush retaining sections for retaining the base sections of the first and second brushes so that the end sections of the first and second brushes are brought in contact with a peripheral surface of the commutator;

wherein each of the first and second brushes is formed from an elongated straight strip, and the pair of brush retaining sections position the first and second brushes in a fan-like manner so that the first and second brushes define an angle between 93° and 115° when the first and second brushes are mounted on the brush holder but before the commutator is disposed inside the first and second brushes;

wherein the brush holder is circular and has a thick section, the brush retaining sections being formed in the thick section and including slits for retaining the first and second brushes, and the slits of the brush retaining sections extending generally toward the center of the brush holder and disposed in a fan-like manner to define an inner angle between 93° and 115°; and wherein the brush holder has a thinner section defining through-holes positioned on extension lines of the slits of the brush retaining sections such that the first and second brushes can be reached from outside through the through-holes and moved outwardly with respect to the center of the brush holder.

* * * * *